United States Patent
Reagan et al.

(10) Patent No.: US 9,921,819 B2
(45) Date of Patent: Mar. 20, 2018

(54) PERSISTENT MOBILE DEVICE ENROLLMENT

(71) Applicant: AirWatch LLC, Atlanta, GA (US)

(72) Inventors: Spencer Reagan, Atlanta, GA (US); Prasad Sawant, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 109 days.

(21) Appl. No.: 14/584,681

(22) Filed: Dec. 29, 2014

(65) Prior Publication Data

US 2016/0188307 A1 Jun. 30, 2016

(51) Int. Cl.
*G06F 9/44* (2006.01)
*G06F 9/445* (2018.01)
*H04L 29/08* (2006.01)
*H04L 29/06* (2006.01)

(52) U.S. Cl.
CPC ............ *G06F 8/61* (2013.01); *H04L 63/0807* (2013.01); *H04L 63/0869* (2013.01); *H04L 63/0876* (2013.01); *H04L 67/32* (2013.01); *H04L 67/34* (2013.01)

(58) Field of Classification Search
CPC ........ G06F 8/61; H04L 63/0869; H04L 67/32
USPC ....................................................... 717/177
See application file for complete search history.

(56) References Cited

U.S. PATENT DOCUMENTS

| | | | |
|---|---|---|---|
| 6,205,579 B1 * | 3/2001 | Southgate | G01R 31/3177 707/999.202 |
| 7,350,205 B2 * | 3/2008 | Ji | G06F 8/68 455/419 |
| 7,594,107 B1 * | 9/2009 | Parkhill | H04L 63/0823 713/156 |
| 7,836,337 B1 * | 11/2010 | Wu | G06F 11/1438 714/15 |
| 8,555,273 B1 * | 10/2013 | Chia | G06F 8/665 717/168 |
| 8,578,361 B2 * | 11/2013 | Cassapakis | G06F 8/665 717/168 |
| 8,886,964 B1 * | 11/2014 | Tonkinson | H04L 9/0877 713/193 |
| 9,112,749 B2 * | 8/2015 | Dabbiere | G06F 21/60 |
| 9,185,099 B2 * | 11/2015 | Brannon | H04L 63/08 |
| 2001/0047514 A1 * | 11/2001 | Goto | G06F 8/65 717/170 |
| 2003/0097433 A1 | 5/2003 | Park et al. | |

(Continued)

FOREIGN PATENT DOCUMENTS

KR         100646359       11/2006

OTHER PUBLICATIONS

International Search Report dated Apr. 8, 2016 for Application No. PCT/US2015/066903.

*Primary Examiner* — Lewis A Bullock, Jr.
*Assistant Examiner* — Theodore Hebert
(74) *Attorney, Agent, or Firm* — Clayton, McKay & Bailey PC

(57) ABSTRACT

Embodiments of the disclosure are directed to a persistent enrollment of a device in a management system. Upon detection of a triggering event, detection of whether an activator application is installed is performed. Then, detection of whether an agent application is installed also performed. The agent application can then complete an enrollment of the device with a management system. Certain components of such a process can be bundled with the device operating system or as a system application.

20 Claims, 5 Drawing Sheets

(56) References Cited

U.S. PATENT DOCUMENTS

| | | | |
|---|---|---|---|
| 2005/0204353 A1* | 9/2005 | Ji | G06F 8/68 717/168 |
| 2011/0173598 A1* | 7/2011 | Cassapakis | G06F 8/665 717/168 |
| 2012/0265690 A1* | 10/2012 | Bishop | G06Q 20/341 705/75 |
| 2013/0212278 A1* | 8/2013 | Marshall | H04L 47/70 709/226 |
| 2013/0212650 A1* | 8/2013 | Dabbiere | H04L 63/10 726/4 |
| 2014/0109194 A1* | 4/2014 | Manton | H04L 63/08 726/4 |
| 2014/0237236 A1 | 8/2014 | Kalinichenko et al. | |
| 2014/0280934 A1* | 9/2014 | Reagan | H04L 47/70 709/225 |
| 2014/0282894 A1* | 9/2014 | Manton | H04L 63/102 726/4 |
| 2016/0132310 A1* | 5/2016 | Koushik | H04L 67/10 717/176 |

\* cited by examiner

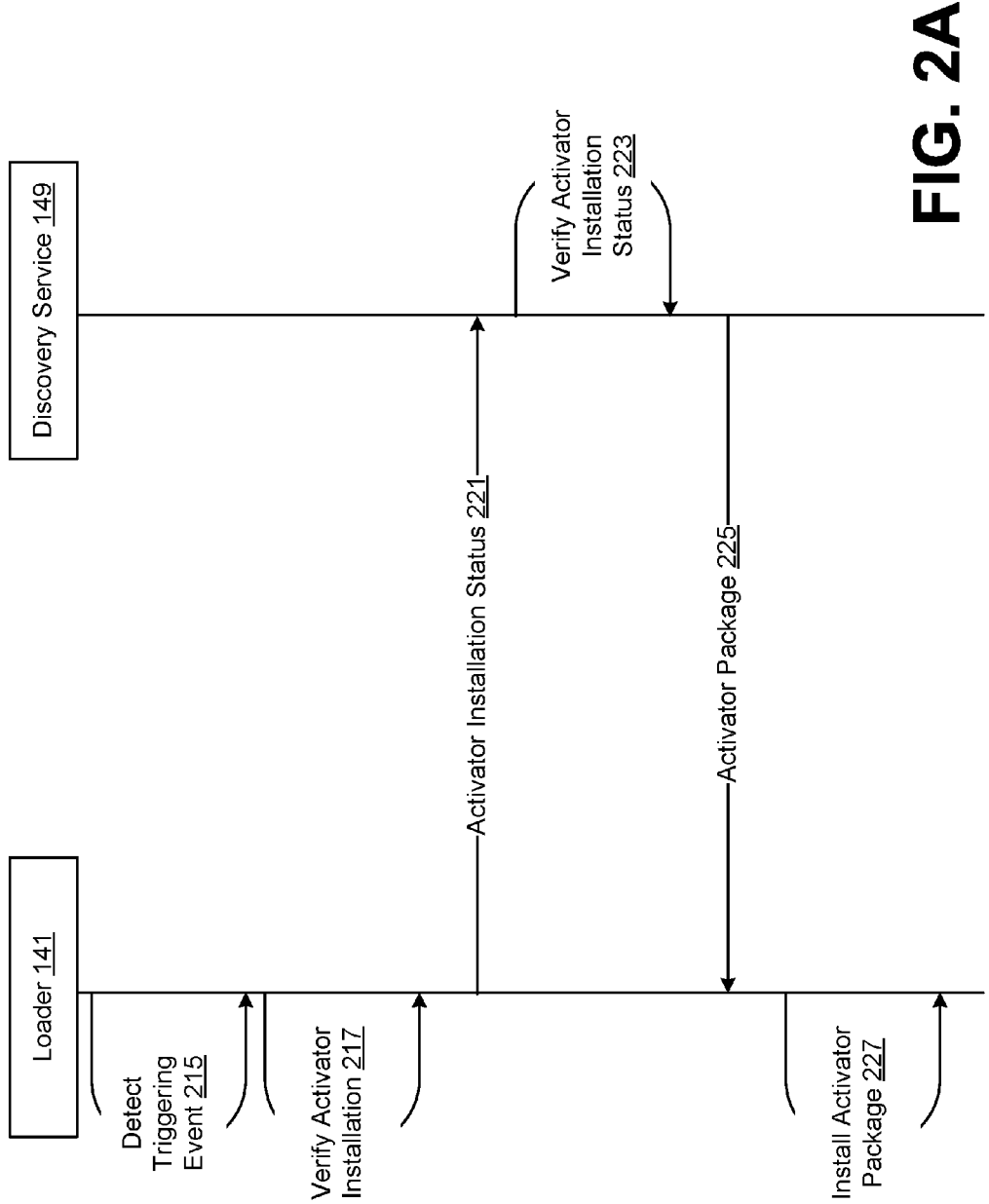

PERSISTENT MOBILE DEVICE ENROLLMENT

BACKGROUND

An enterprise or organization may issue mobile devices, computing devices, or other types of electronic devices to its employees or other types of users associated with the organization. In other scenarios, a user may use his or her own client device in an enterprise environment, such as by connecting the client device to an enterprise mail server or other enterprise resources. In this sense, these client devices can be enrolled with an enterprise environment or management system. However, client devices that are issued by an organization or that belong to a user can be resold or reissued to other users, and this enrollment of the client device may not persist.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2B are sequence diagrams illustrating functionality of a client device and computing environments in the networked environment of FIG. 1 according to various embodiments.

DETAILED DESCRIPTION

The present disclosure relates to enrolling client devices, such as a mobile device or other type of computing device, within a management system (e.g. a remote management server connected via network) as well as facilitating persistence of the enrollment regardless of whether user data is deleted from the client device. In other words, even if a client device is enrolled within a management system and later returned to a factory reset condition where user data is deleted from the client device or where the client device is attempted to be un-enrolled from the management system, embodiments of the disclosure can facilitate persistence of the enrollment using a particular set of user credentials within the management system.

In one embodiment, a loader service, which can comprise a portion of a client device operating system, a system application, or any software package or application with which the client device is loaded by an original equipment manufacturer (OEM), can facilitate determination of whether the client device is configured with the appropriate software packages as well as whether the client device is enrolled in a remote management system. In one scenario, the loader service can detect a triggering event associated with a client device, such as by detecting the powering on of the client device or startup of an operating system of the client device. Upon detecting startup of the client device, the loader service can determine whether an activator application is installed upon the client device. The loader service can also detect whether the activator application is installed in response to other triggering events, such as a passage of a particular period of time, connection of the client device to a particular network, a change in the location of a client device, compliance or non-compliance with a compliance rule, or any other change in the state of the client device.

The activator application is configured to initiate registration of the client device with a management system as well as determine whether an agent application that facilitates enrollment of the client device with a management system is installed on the device. In this way, each time startup of the client device or any other triggering event is detected, the loader service and activator application can collectively verify that the client device is loaded with the appropriate software and configurations such that it is enrolled with a management system. In this way, an organization issuing a client device to a user can ensure that the client device remains enrolled with a particular management system even if the client device is returned to its factory reset condition. Additionally, embodiments of the disclosure can also allow an administrative user to modify the user credentials with which a particular client device is enrolled within a management system without intervention of the user.

Figure 1:
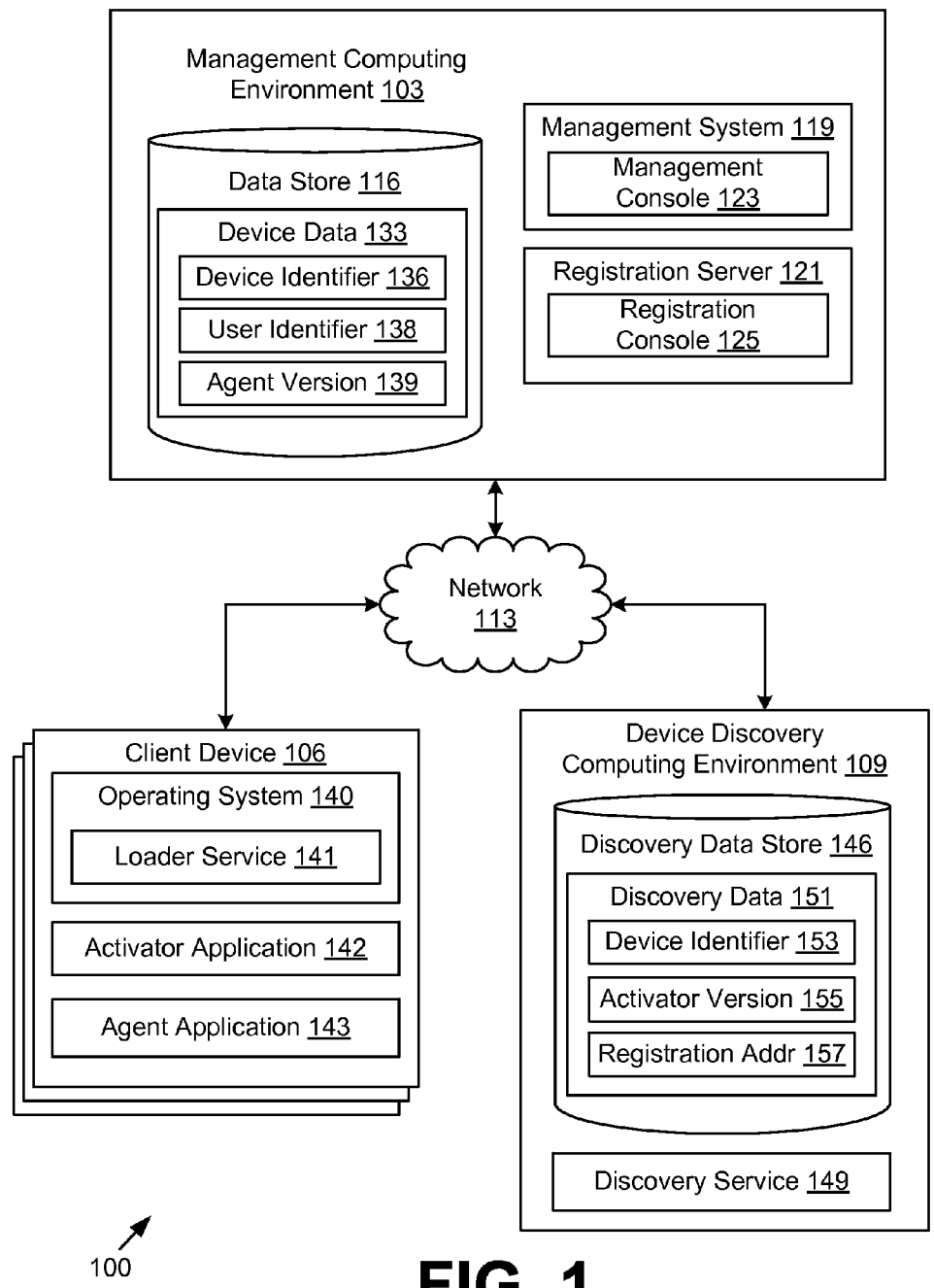
FIG. 1 is a drawing of a networked environment according to various embodiments.

With reference to FIG. 1, shown is a networked environment 100 according to various embodiments. The networked environment 100 shown in FIG. 1 includes a management computing environment 103, a client device 106, a device discovery computing environment 109, and potentially other components, which are in data communication with each other over a network 113. The network 113 includes, for example, the Internet, one or more intranets, extranets, wide area networks (WANs), local area networks (LANs), wired networks, wireless networks, other suitable networks, or any combination of two or more such networks. Such networks may comprise satellite networks, cable networks, Ethernet networks, telephony networks, and/or other types of networks.

The management computing environment 103 facilitates management an enrollment of client devices 106 associated with users. The management computing environment 103 may comprise, for example, a server computer or any other system providing computing capabilities. Alternatively, the management computing environment 103 may employ multiple computing devices that may be arranged, for example, in one or more server banks, computer banks, or other arrangements. Such computing devices may be located in a single installation or may be distributed among many different geographical locations. For example, the management computing environment 103 may include multiple computing devices that together form a hosted computing resource, a grid computing resource, and/or any other distributed computing arrangement. In some cases, the management computing environment 103 may operate as at least a portion of an elastic computing resource where the allotted capacity of processing, network, storage, or other computing-related resources may vary over time. The management computing environment 103 may also include or be operated as one or more virtualized computer instances that are executed in order to perform the functionality that is described herein.

Various systems may be executed in the management computing environment 103. Also, various data is stored in a data store 116 that is accessible to the management computing environment 103. The data store 116 shown in FIG. 1 may be representative of multiple data stores 116. The data stored in the data store 116 is associated with the operation of the various components described below.

A management system 119, a registration server 121 and/or other systems may be executed in the management computing environment 103. The management system 119 may be executed to manage and/or oversee the operation of multiple client devices 106. In some embodiments, an enterprise, such as one or more companies or other organizations, may operate the management system 119 to oversee and/or manage the operation of the client devices 106 of its employees, contractors, customers, etc.

The management system 119 may include a management console 123 and/or other components. The management console 123 may facilitate administration of client devices 106 of an enterprise by administrators through the management system 119. For example, the management console 123 may generate one or more user interfaces that are rendered on a display device to facilitate interaction with the management system 119. Such user interfaces may facilitate an administrator's inputting of commands or other information for the management system 119. Additionally, the user interfaces may include presentations of statistics or other information regarding the client devices 106 that are managed by the management system 119. The management system 119 can also facilitate enrollment of a client device 106 as well as other management, data synchronization or other administrative tasks that are related to a management system framework.

The registration server 121 is a system with which a client device 106 may interact in order to initiate a process of enrolling the client device 106 with a management system 119. In some embodiments, a registration server 121 can be executed in a separate computing environment from the management system 119. In the depicted scenario, the registration server 121 can interact with the client device 106 to provide a network address of the management system 119 with which a particular client device 106 should interact. Additionally, the registration server 121 can provide a client device 106 with a copy of an appropriate agent application 143 that may be installed upon a client device 106 as well as one or more user credentials with which a particular client device 106 can be associated.

The registration server 121 may include a registration console 125 and/or other components. The registration console 125 may facilitate administration of client devices of an enterprise by allowing administrators of a particular management system 119 to associate a particular client device 106 by its device identifier 136 with a particular instance of the registration server 121 and/or management system 119. In one embodiment, an administrator can provide a device identifier 136 together with an address, such as a network address, of the registration server 121 to the registration console 125. The registration server 121 can link the device identifier 136 with an identifier associated with the registration server 121 and/or management system 119, which can also be provided to or synchronized with a device discovery computing environment 109 and/or a discovery data store 146.

The data stored in the data store 116 may include device data 133 and/or other information. The device data 133 may include information regarding the client devices 106 that are managed and/or controlled by the management system 119. The device data 133 for a particular client device 106 may include, for example, the identification of a user assigned to the client device 106, the identification of applications that are installed in the client device 106, historical data regarding the operation of the client device 106, and/or other information.

In addition, the device data 133 for a particular client device 106 may include one or more device profiles. A device profile may comprise an enumeration of one or more compliance rules that may be specified by the management system 119. A compliance rule, for example, can include a requirement that a particular client device 106 be unmodified or untampered with. A compliance rule can also specify that an action that can be taken by the agent application 143 or any other application executed by the client device 106 should a particular compliance rule be violated.

Each compliance rule may specify one or more conditions that must be satisfied for a client device 106 to be deemed compliant with the compliance rule. As a non-limiting example, a compliance rule may specify that particular applications are prohibited from being installed on a client device 106. As another non-limiting example, a compliance rule may specify that a lock screen is required to be generated when the client device 106 is "awoken" from a low power (e.g., "sleep") state and that a passcode is required for a user of the client device 106 to unlock the lock screen. Additionally, one or more compliance rules may be based on time, geographical location, and/or other predefined conditions. When the compliance rules for a particular device profile are satisfied, the management system 119 may deem the corresponding client device 106 as being compliant with the device profile. A compliance rule can also identify a particular device condition that should be detected and reported by the agent application 143 to the management system 119. For example, a compliance rule can specify that information regarding whether the device is modified, a device's location, or other device parameters, should be periodically detected by the agent application 143 and reported to the management system 119.

Additionally, for each client device 106 managed by the management system 119, the device data 133 can also include a device identifier 136 that uniquely identifies a particular client device 106. For example, a device identifier 136 a may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. A particular client device 106 can also be associated with a user identifier 138 that associates a particular user account with the client device 106 associated with the device identifier 136. In some embodiments, the device data 133 can also include other user account data, such as a username, password, other authentication credentials or other user data that may be stored in association with a user account.

The device data 133 can also include an indication of an agent version 139, or a version of an agent application 143 that should be installed upon a particular client device 106 associated with the device identifier 136. In some scenarios, different client devices 106 may be associated with different versions of an agent application 143 that is executed by a respective client device 106 to facilitate management of the client device 106 on behalf of the management system 119.

The device discovery computing environment 109 may comprise, for example, a server computer or any other system providing computing capabilities. Alternatively, the device discovery computing environment 109 may employ multiple computing devices that may be arranged, for example, in one or more server banks, computer banks, or other arrangements. Such computing devices may be located in a single installation or may be distributed among many different geographical locations. For example, the device discovery computing environment 109 may include multiple computing devices that together form a hosted computing resource, a grid computing resource, and/or any other distributed computing arrangement. In some cases, the device discovery computing environment 109 may operate as at least a portion of an elastic computing resource where the allotted capacity of processing, network, storage, or other computing-related resources may vary over time. The device discovery computing environment 109 may also include or be operated as one or more virtualized computer instances that are executed in order to perform the functionality that is described herein.

The device discovery computing environment 109 may be operated by an entity that is a third party relative to an operator of management computing environment 103. For example, an OEM may operate the device discovery computing environment 109 in order to direct a newly provisioned client device 106 to the appropriate address for the registration server 121 and/or management system 119 for enrollment with the management system 119. In other words, should a client device 106 that has been powered on in a factory reset condition, or with no user data or device profile data provisioned upon the client device 106, the client device 106 can communicate with the device discovery computing environment 109 in order to discover the network address of a registration server 121 with which it should communicate in order to enroll itself with a management system 119.

Accordingly, the device discovery computing environment 109 can execute the discovery service 149 in order to facilitate such a discovery process on behalf of a client device 106. The device discovery computing environment 109 can be associated with a particular network address with which a loader service 141 can be preconfigured to communicate. Such a network address, such as a particular hostname in a particular domain name, can be configured to remain constant so that at any point in the future, should a client device 106 be returned to a factory reset state or should user data be wiped or erased from the device, the client device 106 will communicate with the device discovery computing environment 109 and restart the enrollment process with the appropriate management system 119. Accordingly, such a solution can allow various entities to separately operate a management system 119 and/or registration server 121 and the discovery service 149 can direct a particular client device 106 to the appropriate registration server 121 to continue an enrollment process so long as the discovery service 149 can access information with respect to the device identifier 136 associated with the client device 106 as well as an address of the registration server 121.

In some embodiments, communications from the loader service 141 and the discovery service 149 can be authenticated by employing hash message authentication code (HMAC) so that a response from the discovery service 149 to the loader service 141 can be verified as authentic, reducing the possibility of a malicious application being installed upon the client device 106. In some embodiments, communications between the loader service 141 and discovery service 149 can be encrypted using a pre-shared key with which the client device 106 is provided by an OEM.

The discovery data store 146 can store information with respect to client devices 106 to facilitate a discovery process initiated by a client device 106. The discovery data store 146 can include discovery data 151 that includes entries for various client devices 106 for which the discovery service 149 can facilitate a discovery process. An entry within the discovery data 151 can include a device identifier 153 that uniquely identifies a particular client device 106. The discovery data 151 can also include data with respect to a version of the activator application 142, or an activator version 155, that is associated with a particular client device 106. Various models of a particular client device 106 and/or various organizations issuing a client device 106 may specify different versions of an activator application 142 that should be installed on a particular client device 106. Discovery data 151 can also include a registration address 157 that indicates a network address of a registration server 121 with which a particular client device 106 should communicate in order to complete a registration and/or enrollment process with the management system 119. The discovery service 149 can also facilitate obtaining or synchronizing the discovery data 151 with data entered by an administrator via a registration console 125 and stored as device data 133 within the management computing environment 103.

The client device 106 is representative of multiple client devices 106 that may be coupled to the network 113. The client device 106 may comprise, for example, a processor-based system such as a computer system. Such a computer system may be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 may include a display as well as one or more input devices, such as a mouse, touch pad, etc., that facilitates a user input or other types of data input into the client device 106.

The client device 106 may be configured to execute an operating system 140, an activator application 142, an agent application 143, and/or other components. The operating system 140 can include a device operating system that is bundled with the client device 106 by an OEM, a carrier, distributor, or any other entity. The loader service 141 comprises a software application, module, library, operating system capability or any other software that can be installed upon the client device 106 as a part of the operating system or as a system application that is not user modifiable without root or administrator privileges. The loader service 141 is executed as a part of or in association with the operating system in order to detect startup or any other triggering event associated with the client device 106, whether by detecting a power-on of the client device 106, a startup of the operating system 140, a location parameter of the client device 106, receipt of a command from the management system 119, or any other triggering event. Upon detecting a triggering event, the loader service 141 determines whether the activator application 142 is installed upon the client device 106.

The loader service 141 can report an installation status with respect to the activator application 142 to the discovery service 149. The installation status may indicate a device identifier associated with the client device 106, whether the activator application 142 is installed upon the client device 106, and/or a version of the currently installed activator application 142. If there is no activator application 142 installed upon the client device 106 or if a deprecated version of the activator application 142 is installed upon the client device 106 as indicated by the discovery data 151, the loader service 141 can obtain an appropriate version of the activator application 142 from the discovery service 149 and initiate installation of the activator application 142 upon the client device 106. The loader service 141 can also obtain a hash code corresponding to the activator application 142 so that a binary file corresponding to the activator application 142 that is obtained from the discovery service 149 can be verified. The activator application 142 can comprise a software package that is platform-signed with a security key associated with the OEM, with a particular device model, and/or a particular operating system such that it can be installed with elevated privileges without user intervention. The elevated privileges can allow the activator application 142 to be installed with sufficient device permissions to enroll the client device 106 in a management system 119 and/or accept or bypass administrator requests generated by the operating system 140 necessary to enroll the client device 106 on behalf of the user.

Accordingly, once the activator application 142 is installed upon the client device 106, the activator application 142 can obtain the registration address 157 from the discovery service 149. From this point, the activator application 142 and/or agent application 143 can communicate with the registration server 121 and/or management system 119. The activator application 142, once installed, can determine whether the agent application 143 is also installed upon the client device 106. If the activator application 142 determines that the agent application 143 is not installed, the activator application 142 can report the device identifier of the client device 106 to the registration server 121, which can provide a copy of the appropriate version of the agent application 143 to the client device 106 as well as a user credential, such as an authentication token or one-time password, to the client device 106. The authentication token may, in one example, comprise a 32 character token that is stored external to data associated with the activator application 142 such that, even if the activator application 142 is removed, the authentication token may persist to facilitate subsequent enrollment by the agent application 143.

If the agent application 143 is not installed upon the client device 106, the activator application 142 can install the agent application 143 obtained from the registration server 121 and accept on behalf of a user of the client device 106 any security prompts associated with device administrator privileges or security permissions needed in order to enroll the client device 106 with the management system 119. The activator application 142 can accept such permissions because it can be configured as a platform-signed application that is signed with an OEM security key. If the activator application 142 is not a platform-signed by an OEM security key or otherwise provided with permission or privileges allowing the activator application 142 to accept such a prompt on behalf of the user, a user may be able to deny the ability of the activator application 142 to enroll the client device 106 with the management system 119. The activator application 142 can also instruct the agent application 143 to enroll the client device 106 with a particular management system 119 as well as with a particular user account associated with the user credential obtained from the registration server 121 without user intervention.

The agent application 143 may be executed in the client device 106 to monitor and/or manage at least a portion of the data, applications, hardware components, etc., for the client device 106. The agent application 143 can also complete the process of enrolling the client device 106 with the management system 119 associated with a particular organization with a user account associated with the user credential obtained from the registration server 121. The agent application 143 is also executed to facilitate management of the client device 106 in accordance with compliance rules and policies set forth by the management system 119. For example, the agent application 143 can identify whether the client device 106 is operating in accordance with compliance rules for one or more device profiles that have been assigned to the client device 106. In some embodiments, the agent application 143 may function as a management service that operates as a portion of an operating system for the client device 106. In other embodiments, the agent application 143 may function as a management agent that operates in the application layer of the client device 106 and that monitors at least some of the activity being performed in the client device 106. In other embodiments, the agent application 143 may comprise an application wrapper that interfaces with a software component to facilitate overseeing, monitoring, and/or managing one or more resources of the client device 106. Alternatively, the agent application 143 may be a portion of an application that was developed, for example, using a Software Development Kit (SDK) that facilitates the inclusion of functionality within the application that monitors and/or manages at least a portion of the resources for the client device 106.

The agent application 143 may be executed by the client device 106 automatically upon startup of the client device 106. Additionally, the agent application 143 may run as a background process in the client device 106. Accordingly, the agent application 143 may execute without user intervention in some embodiments. Additionally, the agent application 143 may communicate with the management system 119 in order to facilitate management of the client device 106 by the management system 119. For example, the agent application 143 can transmit status information with respect to the client device 106 and receive commands to implement or actions to take upon the client device in response to the status information. As one example, status information can be associated with a device operating condition, such as a network status, whether the device operating system has been modified or tampered with, location information, or other status information. A command received from the management system 119 can comprise an instruction to delete or wipe data from the client device 106, display a user interface prompt upon the client device 106, modify an enrollment of the client device 106, or other actions.

The loader service 141 can be configured to detect the presence of the appropriate version of the activator application 142 by periodically reporting its installation status to the discovery service 149, upon startup of the client device 106, or upon detecting any other triggering event. If the activator application 142 is removed by a user, the loader service 141 can obtain the activator application 142, install the activator application 142 and re-initiate the enrollment of the client device 106 with the registration server 121 and/or management system 119 associated with the device identifier associated with the client device 106. In some embodiments, the loader service 141 can be configured to trigger a software event within the client device 106 should the activator application 142 be removed or deleted from the client device 106. Accordingly, the loader service 141 can be configured with an event listener that listens for software event corresponding to removal or deletion of the activator application 142 from the client device 106 and thusly it may detect deletion or removal of the activator application 142 in response to receiving such a software event.

Similarly, the activator application 142 can be configured to detect the presence of the appropriate version of the agent application 143 by periodically reporting its installation status to the registration server 121 and/or management system 119, upon startup of the client device 106, or upon detecting any other triggering event. If the agent application 143 is removed by a user or if the client device 106 is unenrolled from the management system 119, the activator application 142 can obtain the agent application 143 as well as a user credential with which the client device 106 should be enrolled within the management system 119, install the agent application 143 and instruct the agent application 143 to complete enrollment of the client device 106 with the management system 119. In some embodiments, the agent application 143 can be configured to trigger a software event within the client device 106 should the agent application 143 be removed or deleted from the client device 106 or should the client device 106 be removed or un-enrolled from management by the management system 119. Accordingly, the activator application 142 can be configured with an event listener that listens for software event corresponding to removal or deletion of the activator application 142 from the client device 106 and may also detect deletion or removal of the agent application 143 as well as un-enrolling of the client device 106 in response to receiving such a software event.

Therefore, because the loader service 141 is bundled with the client device 106 as a component of the operating system 140 and/or a system application with which the client device 106 is shipped, the client device 106 can be enrolled with the appropriate management system 119 without requiring the user to take an action to enter a network address associated with the management computing environment 103, user credentials or any other user inputs. Additionally, enrollment of the client device 106 with the management system 119 can be detected and enforced whenever the client device 106 is powered on or the operating system 140 boots on the client device 106 because the loader service 141 is configured to ensure installation of the activator application 142. Because the activator application 142 is platform-signed with an OEM security key, the activator application 142 is empowered to install the agent application 143 and provide acceptance of device administrator prompts on behalf of the user to complete enrollment of the client device 106 with the management system 119.

The functionality of the loader service 141 and activator application 142 can be combined in certain embodiments. Bifurcation of the functionality of the loader service 141 and activator application 142 can be adopted for various reasons. In some embodiments, the activator application 142 can be configured as a lightweight software package relative to the agent application 143. Additionally, the loader service 141 that is bundled with a large number of devices that are potentially associated with different enterprises, organizations, and/or management systems 119 may all be preconfigured to initially communicate with a common device discovery computing environment 109. Accordingly, it may be desirable to have a client device 106 obtain the lightweight activator application 142 from the device discovery computing environment 109 while obtaining the potentially larger agent application 143 from the management computing environment 103 associated with the particular enterprise or organization that is associated with the client device 106. Additionally, the functionality of the agent application 143 may be updated more frequently than the functionality of the activator application 142, whose responsibility can be limited to ensuring installation of the agent application 143.

Referring next to FIG. 2A, shown is a sequence diagram that illustrates an example of interactions between the loader service 141 that is bundled with the operating system 140 and the discovery service 149. The sequence diagram of FIG. 2A can reflect operation of the loader service 141 upon startup of a client device 106 in a factory reset condition or with no user data present upon the client device 106. As shown in FIG. 2A, the loader service 141 can detect a triggering event, such as a startup of the client device 106, at arrow 215. A triggering event of the client device 106 can be detected by detecting that the client device 106 has been powered on or that the operating system 140 has been booted or executed. The loader service 141 can then verify installation of the activator application 142 at arrow 217.

The loader service 141 can then report the activator installation status to the discovery service at arrow 221. The activator installation status can indicate whether the activator application 142 is installed upon the client device 106 and/or a version of the activator application 142 that is installed upon the client device 106. In this way, the loader service 141, in conjunction with the discovery service 149, can facilitate a determination that the correct version of the activator application 142 is installed upon the client device 106 upon detection of a triggering event. At arrow 223, the discovery service 149 verifies the installation status of the activator application 142. At arrow 223, the discovery service 149 transmits a copy of the appropriate version of the activator application 142 associated with the device identifier of the client device 106 as well as a network address of the registration server 121 associated with the enterprise or organization of the client device 106 to the loader service 141 at arrow 225. At arrow 227, the loader service 141 initiates installation of the activator application 142.

Figure 2B:
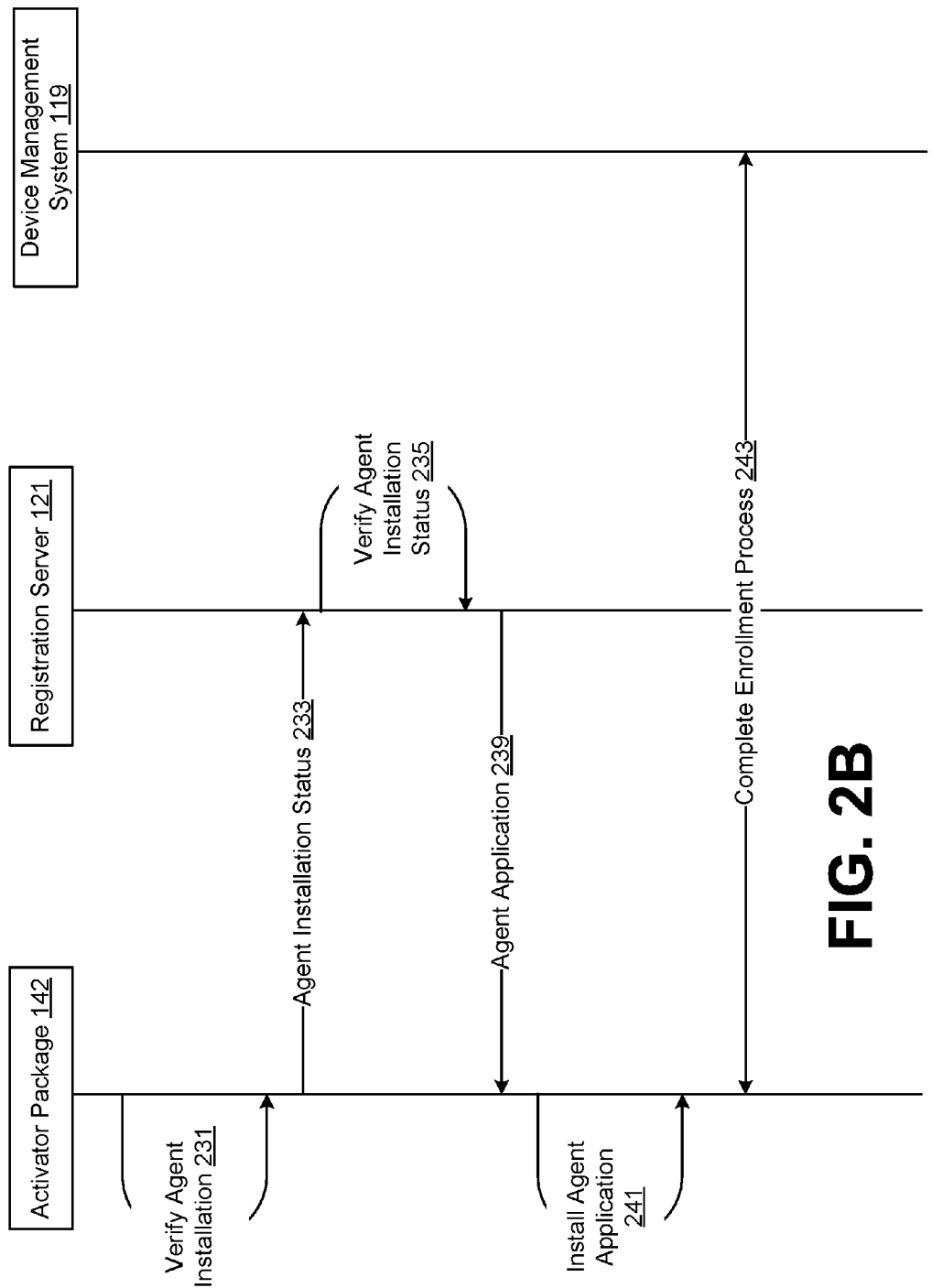

Continuing the sequence diagram of FIG. 2A, reference is now made to FIG. 2B. Now that the loader service 141 has facilitated installation of the correct version of the activator application 142, the activator application 142 can determine whether the agent application 143 is installed upon the client device 106 at arrow 231. At arrow 233, the activator application 142 can transmit the installation status with respect to the agent application 143 to the registration server 121, which can include whether the agent application 143 is installed and/or a version of the agent application 143 that is installed on the client device 106, if any. The registration server 121 can determine whether the client device 106 is configured with the correct version of the agent application 143 and transmit the correct version of the agent application 143 to the client device 106 along with an address of the management system 119 to the activator application 142 as shown at arrow 239.

The registration server 121 can also provide a user credential that is associated with the client device 106 with which the client device 106 can be enrolled with the management system 119. Such a user credential can comprise a one-time password, an authentication token, or other credential that facilitates enrollment with the management system 119 by the agent application 143. The activator application 142 can then initiate installation of the agent application 143 as indicated by arrow 241. As a part of the installation process, the activator application 142 can provide the agent application 143 with the user credentials associated with a user account corresponding to the client device 106 as well as a network address corresponding to the management system 119. The agent application 143 can then complete an enrollment process with the management system 119 as shown by arrow 243. Completion of the enrollment process can include installation of a device profile on the client device 106 that permit the management system 119 to issue commands that facilitate control of or impose restrictions upon the client device 106 that are enforced by the agent application 143.

Figure 3:
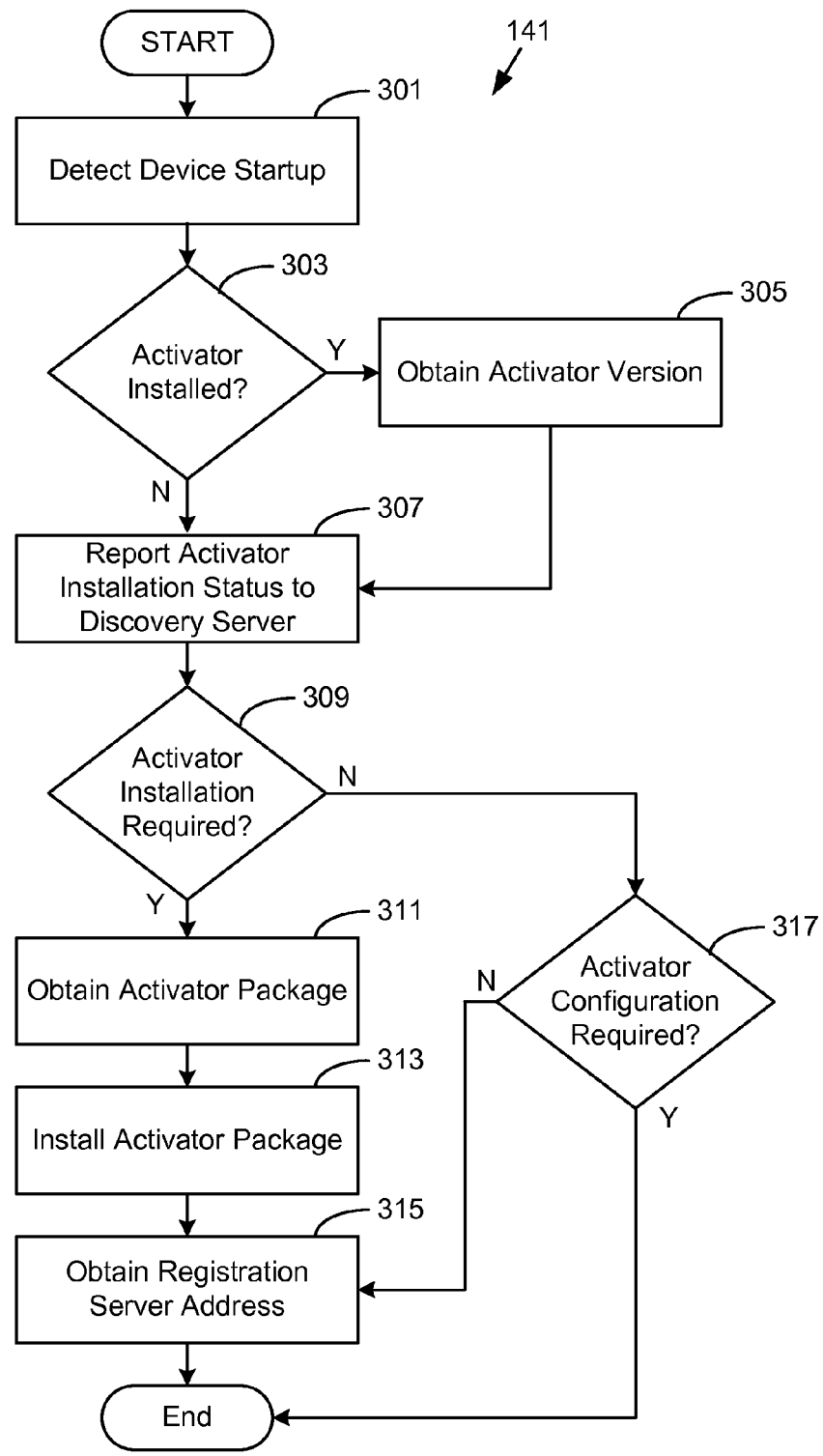
FIG. 3 is a flowchart illustrating an example of functionality implemented by a client device in the networked environment shown in FIG. 1 according to various embodiments.

With reference to FIG. 3, shown is a flowchart that provides an example of a portion of the operation of the loader service 141 according to various embodiments. In particular, FIG. 3 provides an example of the loader service 141 facilitating installation of the activator application 142 according to various embodiments of the disclosure. It is understood that the flowchart of FIG. 3 provides merely an example of the many different types of functional arrangements that may be employed to implement the portion of the operation of the loader service 140 as described herein. As an alternative, the flowchart of FIG. 3 may be viewed as depicting an example of elements of a method implemented in the client device 106 (FIG. 1) according to one or more embodiments.

Beginning at box 301, the loader service 141 executed by the client device 106 detects a triggering event associated with a client device 106. As noted above, the triggering event associated with the client device 106 can be detected by detecting the powering on of the client device 106 and/or startup of the operating system 140. At box 303, the loader service 141 determines whether the activator application 142 is installed on the client device 106. If so, then at box 305 the loader service 141 obtains a version of the activator application 142 that is installed on the client device 106.

Proceeding next to box 307, if installation of the activator application 142 is required based upon the installation status reported to the discovery service 149, the loader service 141 determines whether installation of the activator application 142 is required. If so, then at box 311 the loader service can obtain the appropriate version of the activator application 142 from the discovery service 149 and install the activator application 142 at box 313. Otherwise, the loader service 141 can determine whether the activator application 142 requires configuration, which may, for example, be the case for a client device 106 that has not yet been enrolled in a management system 119. At box 315, the loader service 141 can obtain a network address associated with the registration server 121, which can be provided to the activator application 142 to facilitate enrollment of the client device 106 with the management system 119. Thereafter, the process ends.

Figure 4:
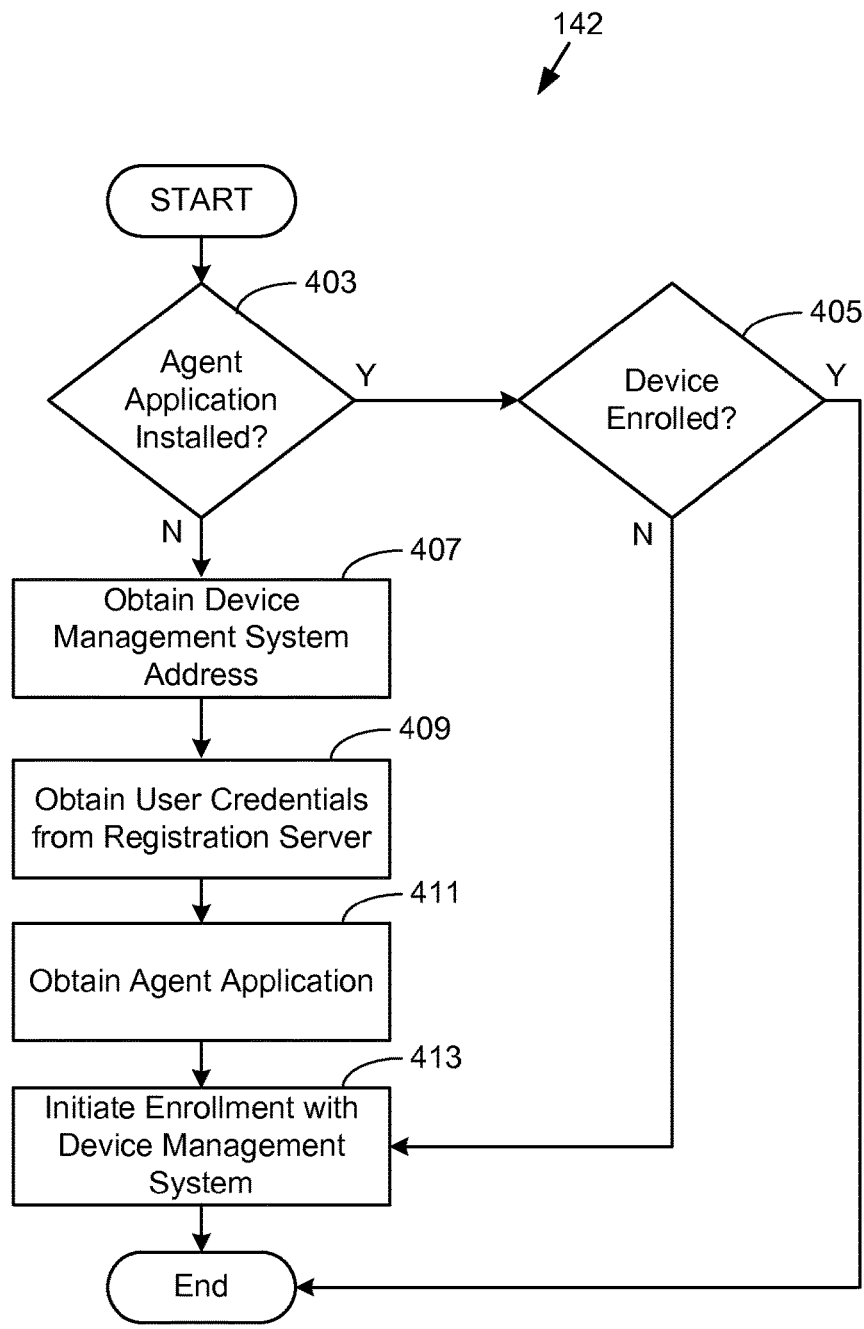
FIG. 4 is a flowchart illustrating an example of functionality implemented by a client device in the networked environment shown in FIG. 1 according to various embodiments.

With reference to FIG. 4, shown is a flowchart that provides an example of a portion of the operation of the activator application 142 according to various embodiments. In particular, FIG. 4 provides an example of the activator application 142 facilitating enrollment of the client device 106 with the management system 119. It is understood that the flowchart of FIG. 4 provides merely an example of the many different types of functional arrangements that may be employed to implement the portion of the operation of the activator application 142 as described herein. As an alternative, the flowchart of FIG. 4 may be viewed as depicting an example of elements of a method implemented in the client device 106 (FIG. 1) according to one or more embodiments.

The activator application 142 can be executed once the loader service 141 has either verified the installation of the activator application 142 or upon installation of the activator application 142 by the loader service 141. In other words, the activator application 142 can be executed upon a triggering event associated with the client device 106, such as a startup of the client device 106, to verify that the agent application 143 is installed as well as that the client device 106 is enrolled with the management system 119. At box 403, the activator application 142 can determine whether the agent application 143 is installed on the client device 106. If the agent application 143 is installed on the client device 106, then at box 405 the activator application 142 determines whether the client device 106 is enrolled with the management system 119. If so, then the process can proceed to completion. Otherwise, the process can proceed to box 413, where the activator application 142 can initiate enrollment of the client device 106 with the management system 119.

If the agent application 143 is not installed upon the client device 106, the activator application 142 proceeds from box 403 to box 407, where the activator application 142 can obtain a network address associated with the management system 119 to facilitate enrollment of the client device 106. Next, at box 409, the activator application 142 can obtain user credentials from the registration server 121 that are associated with a user account corresponding to the client device 106. At box 411, the activator application 142 can obtain the agent application 143 from the registration server 121, which can be installed upon the client device 106. Next, the process can proceed to box 413, where the activator application 142 can initiate enrollment of the client device 106 with the management system 119 by the agent application 143. Thereafter, the process proceeds to completion.

The flowcharts of FIGS. 3-4 show examples of the functionality and operation of implementations of components described herein. The components described herein can be embodied in hardware, software, or a combination of hardware and software. If embodied in software, each element may represent a module of code or a portion of code that comprises program instructions to implement the specified logical function(s). The program instructions may be embodied in the form of, for example, source code that comprises human-readable statements written in a programming language and/or machine code that comprises machine instructions recognizable by a suitable execution system, such as a processor in a computer system or other system. If embodied in hardware, each element may represent a circuit or a number of interconnected circuits that implement the specified logical function(s).

Although the flowcharts and/or sequence diagrams show a specific order of execution, it is understood that the order of execution may differ from that which is shown. For example, the order of execution of two or more elements may be switched relative to the order shown. Also, two or more elements shown in succession may be executed concurrently or with partial concurrence. Further, in some embodiments, one or more of the elements shown in the flowcharts may be skipped or omitted. In addition, any number of counters, state variables, warning semaphores, or messages might be added to the logical flow described herein, for purposes of enhanced utility, accounting, performance measurement, troubleshooting aid, etc. It is understood that all such variations are within the scope of the present disclosure.

The management computing environment 103, the client device 106, the device discovery computing environment 109, and/or other components described herein may each include at least one processing circuit. Such a processing circuit may comprise, for example, one or more processors and one or more storage devices that are coupled to a local interface. The local interface may comprise, for example, a data bus with an accompanying address/control bus or any other suitable bus structure.

The one or more storage devices for a processing circuit may store data and/or components that are executable by the one or more processors of the processing circuit. For example, the management system 119, the discovery service 149, the registration server 121, and/or other components may be stored in one or more storage devices and be executable by one or more processors. Also, a data store, such as the data store 116 and/or the discovery data store 146, may be stored in the one or more storage devices.

The management system 119, the discovery service 149, the registration server 121, and/or other components described herein may be embodied in the form of hardware, as software components that are executable by hardware, or as a combination of software and hardware. If embodied as hardware, the components described herein can be implemented as a circuit or state machine that employs any suitable hardware technology. Such hardware technology may include, for example but is not limited to, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)), etc.

Also, one or more or more of the components described herein that comprise software or program instructions can be embodied in any non-transitory computer-readable medium for use by or in connection with an instruction execution system such as, for example, a processor in a computer system or other system. Such a computer-readable medium may contain, store, and/or maintain the software or program instructions for use by or in connection with the instruction execution system.

A computer-readable medium can comprise a physical media, such as, magnetic, optical, semiconductor, and/or other suitable media. Examples of a suitable computer-readable media include, but are not limited to, solid-state drives, magnetic drives, flash memory, etc. Further, any logic or component described herein may be implemented and structured in a variety of ways. For example, one or more components described may be implemented as modules or components of a single application. Further, one or more components described herein may be executed in one computing device or by using multiple computing devices. Additionally, it is understood that terms, such as "application," "service," "system," "engine," "module," and so on, may be interchangeable and are not intended to be limiting unless indicated otherwise.

It is emphasized that the above-described embodiments of the present disclosure are merely examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

Therefore, the following is claimed:

1. A method for persistently enrolling a client device with a management system, comprising:
    determining, by a loader service application installed on a client device, in response to determining that the client device has been powered on, whether an activator application is installed upon the client device, the activator application being configured to initiate registration with the management system by obtaining an agent application;
    transmitting, from the client device, an indication that the activator application is not installed to a first computing environment external to the client device and accessible through a network;
    obtaining, from the first computing environment, the activator application in response to determining that the activator application is not installed;
    installing, on the client device, the activator application in response to determining that the activator application is not installed;
    determining, by the activator application, whether the agent application is installed on the client device, the agent application being configured to enroll the client device with the management system; and
    obtaining, by the activator application, the agent application from a second computing environment accessible through the network in response to determining that the agent application is not installed on the client device.

2. The method of claim 1, further comprising:
    transmitting, from the activator application, a device identifier associated with the client device to the second computing environment; and
    obtaining, using the activator application, a credential associated with an account in the second computing environment.

3. The method of claim 2, further comprising enrolling the client device in a management system implemented by the second computing environment using the credential associated with the account.

4. The method of claim 2, wherein the credential comprises an authentication token associated with a user account in a management system.

5. The method of claim 1, further comprising installing, by the activator application, the agent application on the client device in response to determining that the agent application is not installed on the client device.

6. The method of claim 1, wherein the activator application is platform-signed by a private key associated with an original equipment manufacturer associated with the client device.

7. The method of claim 1, wherein determining whether the agent application is installed on the client device further comprises detecting, using the activator application, deletion of the agent application from the client device.

8. The method of claim 7, wherein detecting deletion of the agent application from the client device further comprises obtaining, using the activator application, an event triggered by the agent application signifying uninstallation of the agent application.

9. A non-transitory computer-readable medium embodying program instructions executable in a client device that persistently enroll a client device with a management system, the program instructions being configured to cause the client device to at least:
    determine, by a loader service application installed on the client device, in response to determining that the client device has been powered on, whether an activator application is installed upon the client device, the activator application being configured to initiate registration with the management system by obtaining an agent application;
    transmit, to a first computing environment external to the client device, an indication that the activator application is not installed upon the client device;
    obtain the activator application in response to determining that the activator application is not installed;
    install the activator application in response to determining that the activator application is not installed;

determine whether an agent application is installed on the client device, the agent application being configured to enroll the client device with the management system; and obtain the agent application from a second computing environment accessible from the network in response to determining that the agent application is not installed on the client device.

10. The non-transitory computer-readable medium of claim 9, the program further being configured to cause the client device to at least:

transmit a device identifier associated with the client device to the second computing environment; and obtain a credential associated with an account in the second computing environment.

11. The non-transitory computer-readable medium of claim 10, the program further being configured to cause the client device to at least enroll the client device in a management system implemented by the second computing environment using the credential associated with the account.

12. The non-transitory computer-readable medium of claim 9, wherein startup of the client device comprises a boot-up of an operating system or a powering on of the client device.

13. The non-transitory computer-readable medium of claim 9, the program further being configured to cause the client device to at least:

install the agent application on the client device in response to determining that the agent application is not installed on the client device.

14. The non-transitory computer-readable medium of claim 9, wherein the activator application is platform-signed by a private key associated with an original equipment manufacturer associated with the client device.

15. The non-transitory computer-readable medium of claim 9, wherein the agent application is determined to be installed on the client device by detecting deletion of the agent application from the client device.

16. The non-transitory computer-readable medium of claim 15, wherein deletion of the agent application from the client device is detected by obtaining an event triggered by the agent application signifying uninstallation of the agent application.

17. A client device configured to be persistently enrolled with a management system, comprising:

an operating system executable by at least one processor associated with the client device; and a loader service application bundled with the operating system, the loader service application, in response to the client device powering on, configured to cause the client device to at least:

determine that an activator application is not installed;

install, on the client device, the activator application in response to determining that the activator application is not installed, wherein the activator application is configured to initiate registration with the management system by obtaining an agent application; and install, on the client device, an agent application on the client device in response to determining that the agent application is not installed, the agent application being configured to enroll the client device with the management system.

18. The client device of claim 17, wherein the activator application is configured to activate elevated privileges within the client device without user intervention.

19. The client device of claim 17, wherein the activator application is configured to:

transmit a device identifier associated with the client device to a second computing environment; and obtain a credential associated with an account in the second computing environment.

20. The client device of claim 17, wherein the loader service application is a system application bundled with the operating system and the activator application is platform-signed by a private key associated with an original equipment manufacturer associated with the client device.

* * * * *